(12) United States Patent
Peng

(10) Patent No.: US 7,544,910 B2
(45) Date of Patent: Jun. 9, 2009

(54) VIBRATION SENSOR BUILT IN AN OBJECT

(75) Inventor: Chen-Fu Peng, No. 4, Alloy 14, Lane 93, Sec. 1, Singnan Rd., Jhonghe, Taipei County (TW)

(73) Assignee: Chen-Fu Peng, Jhonghe, Taipei County (TW)

( * ) Notice: Subject to any disclaimer, the term of this patent is extended or adjusted under 35 U.S.C. 154(b) by 443 days.

(21) Appl. No.: 11/450,464

(22) Filed: Jun. 12, 2006

(65) Prior Publication Data

US 2007/0283760 A1    Dec. 13, 2007

(51) Int. Cl.
*H01H 35/14* (2006.01)
(52) U.S. Cl. ............... 200/61.45 R; 73/654; 200/61.53
(58) Field of Classification Search ................... 73/654; 200/61.45 R, 61.53
See application file for complete search history.

(56) References Cited

U.S. PATENT DOCUMENTS 3,649,787 A * 3/1972 Kasabian ............. 200/61.45 R
4,331,848 A * 5/1982 Schneider, Jr. ........ 200/61.45 R
5,565,664 A * 10/1996 Chen ..................... 200/61.45 R

* cited by examiner

*Primary Examiner*—John E Chapman
(74) *Attorney, Agent, or Firm*—Troxell Law Office, PLLC

(57) ABSTRACT

A vibration sensor includes casing, substrate, and elastic metal piece; two electrode areas separated by a separation zone being provided on the substrate; a vibration contact being provided on the separation zone; placement being executed by the metal piece on the substrate to contact or not to contact both electrode areas and produce connection or disconnection at the vibration contacts for selecting to turn on or off a power source and an electronic device connected to the vibration sensor and producing intermittent conduction by means of the sensor built in an object.

13 Claims, 12 Drawing Sheets

VIBRATION SENSOR BUILT IN AN OBJECT

BACKGROUND OF THE INVENTION (a) Field of the Invention

The present invention is related to a vibration sensor, and more particularly, to one that can be built in an object (e.g., apparels, clothes, hats, shoes) for selectively turning on or off a power source and an electronic device connected to the vibration sensor and producing intermittent conduction.

(b) Description of the Prior Art

As illustrated in FIGS. 1 and 2 of the accompanying drawings, a roller vibration switch 1 of the prior art includes a free rolling ball 12 contained in a tube 11 with one end closed; and upper ends of two conductive pins 13, 14 disposed at the open end of the tube 11 enter into the tube 11 for the ball 12 to maintain conducted status while contacting both conductive pins 13, 14. When external vibration is introduced for the ball 12 to jolt, both conductive pins 13, 14 will indicate On or Off status thus to produce control signals to an electronic device to execute necessary control.

However, the construction of the prior art is found with the following limitations and defectives in practical operation:

1. As the ball 12 is contained in a cylindrical tube 11 and only two contacts are provided at its lower end, the tube 11 must be erected in standing status and any excessive tilt of the tube 11 will prevent the ball 12 from contacting both conductive pins 13, 14, thus to lose the results of sensing by vibration.

2. Even the vibration sense can be achieved with the erection of the tube allowed within a certain range of inclination, the central gravity of the ball 12 contained in the tube 11 would have to lean to one side to significantly reduce the sensitivity of the vibration induced, or malfunction in serious case. Therefore, to protect the vibration sensitivity from being significantly affected and to prevent the chance of malfunction, the range of the tilt angle allowed has to be very narrow, and further to put the erection angle and position of the tube 11 under extremely restriction.

3. When the ball 12 contacts only two conductive pins 13, 14, the vibration detection accuracy will not be consistent with regard to all vibration from all directions.

4. If the electronic device is not turned off, the ball 12 can be easily contacted in the course of transportation or display of the product to, thereby, consume all of the power supplied by the cell.

SUMMARY OF THE INVENTION

The primary purpose of the present invention is to provide a vibration sensor that can be built in an object (e.g., apparels, clothes, hats, shoes, or flashlight) for a power source and an electronic device (e.g., light source or loudspeaker) connected to the vibration sensor to optionally turn on or off and produce intermittent conduction.

To achieve the purpose, the present invention is essentially comprised of casing, substrate, and elastic metal piece. Two electrode areas separated by a separation zone are provided on the substrate and a vibration contact separated from both electrode areas is provided on the separation zone. One electrode area is provided with a transmission contact. Both electrode areas may be contacted or not contacted to connect or disconnect of the vibration contact by having the elastic metal piece to execute placement on the substrate. With the vibration sensor built in an object, a power source connected to the vibration sensor is optionally turned on or off, and an electronic device connected to the vibration sensor will produce intermittent conduction.

When the object is being transported or displayed, the power source is disconnected from the electronic device. As a result, even if the vibration sensor is contacted and a circuit is formed, the electronic device will not unnecessarily consume the power source.

Another purpose of the present invention is to provide a vibration sensor that can be built in an object without taking the possible tilt of the erection angle. To achieve the purpose, the elastic metal piece is provided in the accommodation space of the vibration sensor. According, the resulted On or Off effects are not affected disregarding the direction of the vibration. Furthermore, a nipple disposed on the bottom of the elastic metal piece contacts the substrate to make sure of the contact and that the vibration sensitivity will not be affected.

DETAILED DESCRIPTION OF THE PREFERRED EMBODIMENTS

Figure 1:
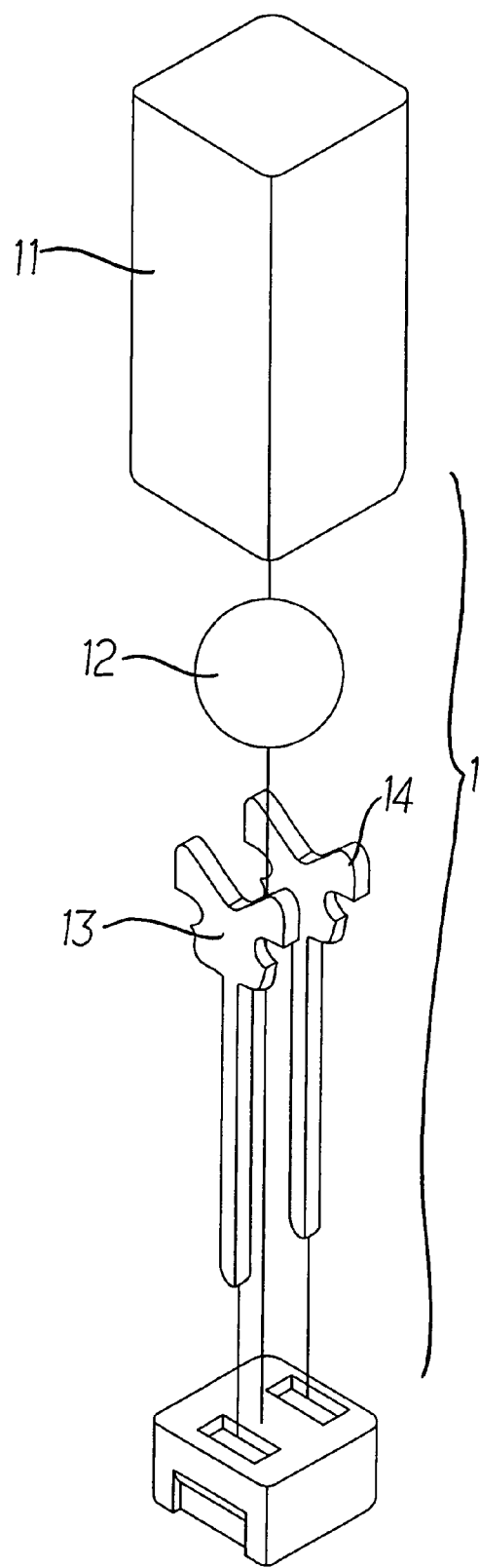
FIG. 1 is an exploded view of a construction of a vibration switch of the prior art.
Figure 2:
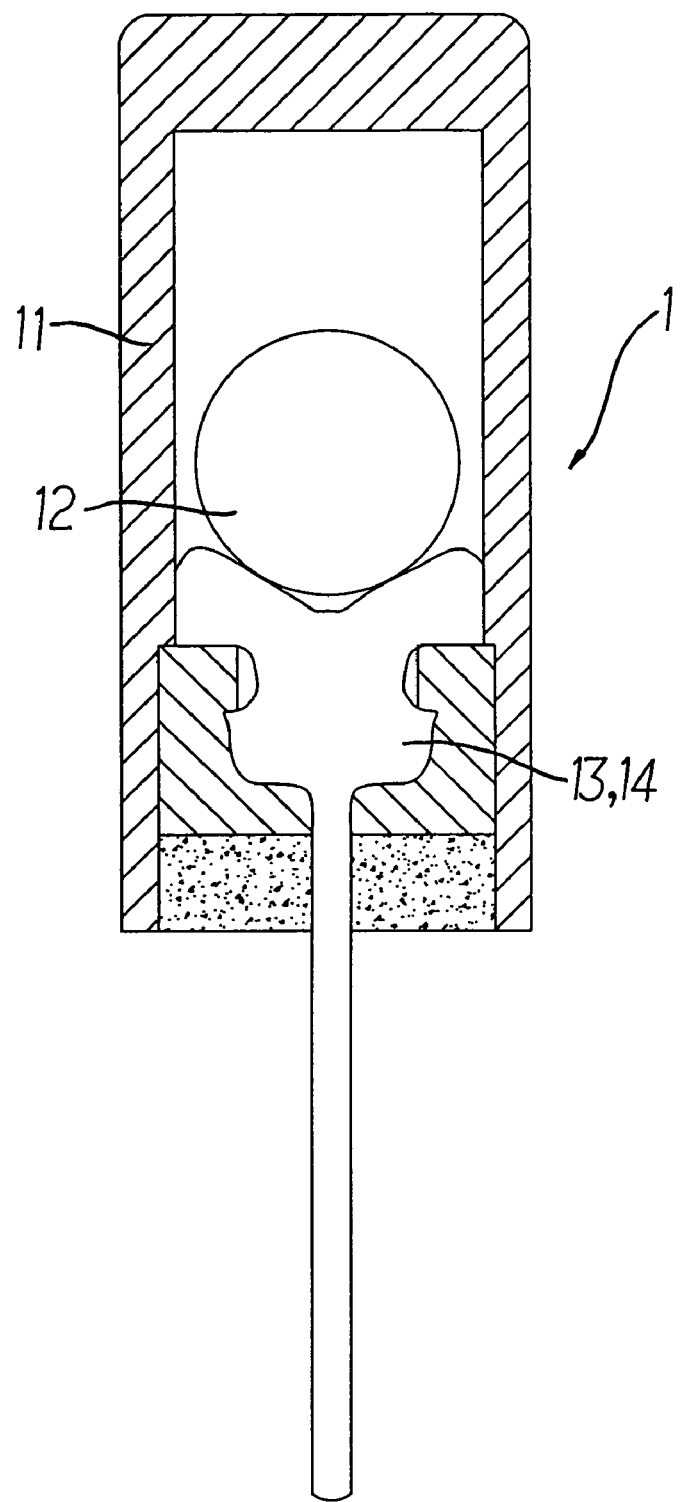
FIG. 2 is a schematic view showing the construction of the vibration switch of the prior art.
Figure 3:
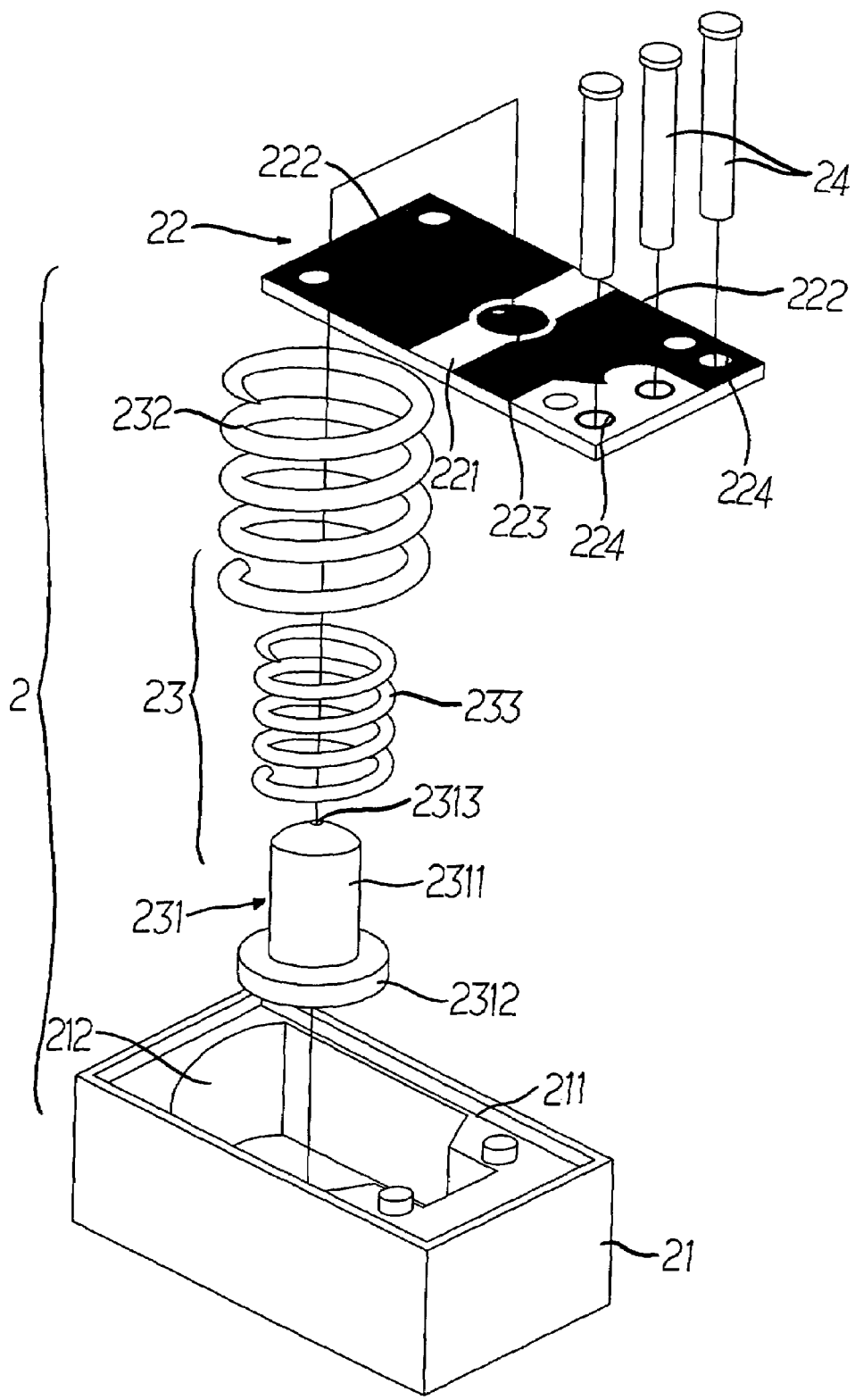
FIG. 3 is an exploded view of a vibration sensor of the present invention.
Figure 4:
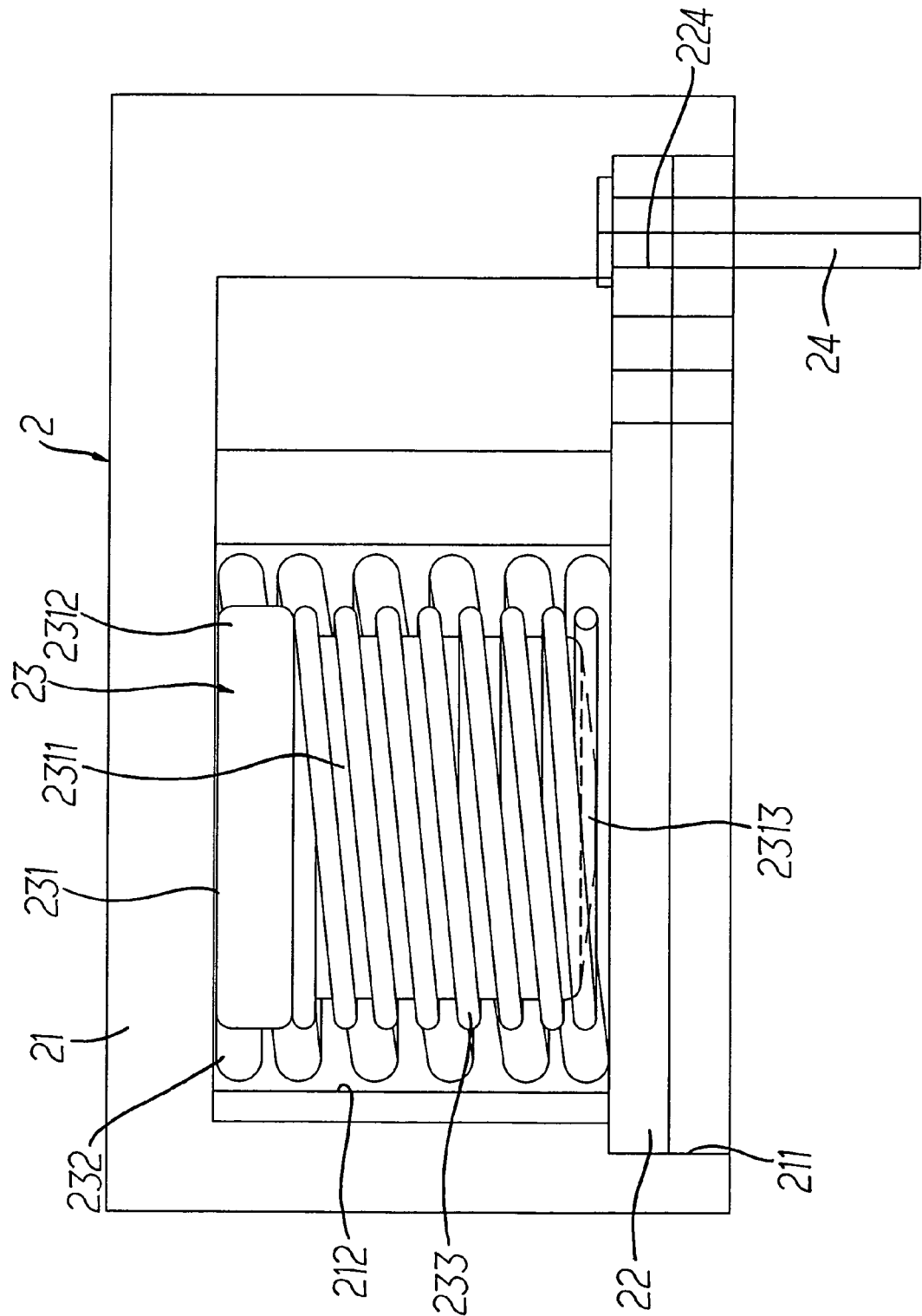
FIG. 4 is a schematic view showing the construction of the vibration sensor of the present invention.

Referring to FIGS. 3 and 4, a vibration sensor 2 of the present invention is essentially comprised of a casing 21, a substrate 22, and an elastic metal piece 23. The casing 21 includes an opening 211 provided on one side of the casing 21 and screened by means of a substrate 22, and an accommodation space 212. The substrate 22 related to a circuit board in the preferred embodiment is provided with two electrode areas 222 separated by a separation zone 221. A vibration contact 223 away from either electrode area is provided on the separation zone 221. Either electrode area 222 is disposed with a transmission contact in a form comprised of three holes 224 as illustrated.

The elastic metal piece 23 is provided in the accommodation space 212 and includes a load 231, an outer coil 232, and an inner coil 233. The load 231 includes a column 2311 and a flange 2312 protruding from the base of the column 231. A nipple 2313 on the side of the column 2311 farther away from the flange 2312 that contacts the substrate 22. The inner diameter of the outer coil 232 is slightly greater than that of the flange 2313 for the outer coil 232 to be merely inserted onto the outer side of the flange 2313. The length of the outer coil 232 is slightly greater than the height of the accommodation space 212 and the inner diameter of the inner coil 233 is slightly greater than that of the column 2311 for the inner coil 233 to be merely inserted onto the outer side of the column 231 with the flange 2312 holding against the inner coil 233.

Figure 5:
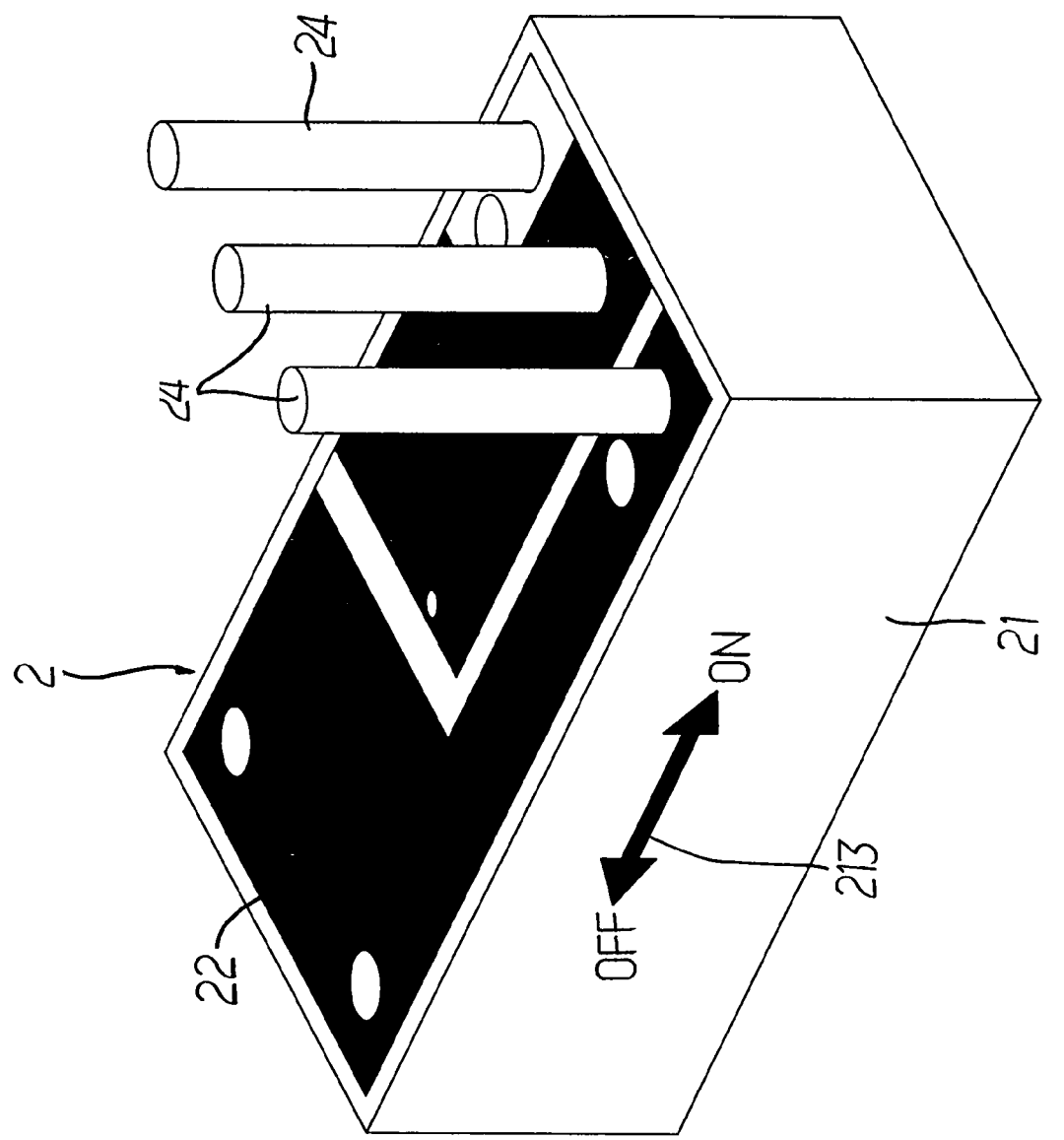
FIG. 5 is a perspective view of the appearance of the vibration sensor of the present invention.

When assembled, the load 231 has its flange facing toward the bottom of the accommodation space 212 and placed therein. Both of the outer coil 232 and the inner coil 233 are respectively inserted onto the flange 2312 and the outer side of the column 2311. Multiple conduction posts 24 (each made in a form to secure tight contact with its corresponding hole) penetrate through their corresponding holes 224 on the substrate 22. Finally the substrate 22 covers up the casing 21 at its opening 211 to complete the assembly as illustrated in FIG. 5 wherein those conductive posts 24 are exposed for a proper length from the casing 21 for electric connection.

Figure 6:
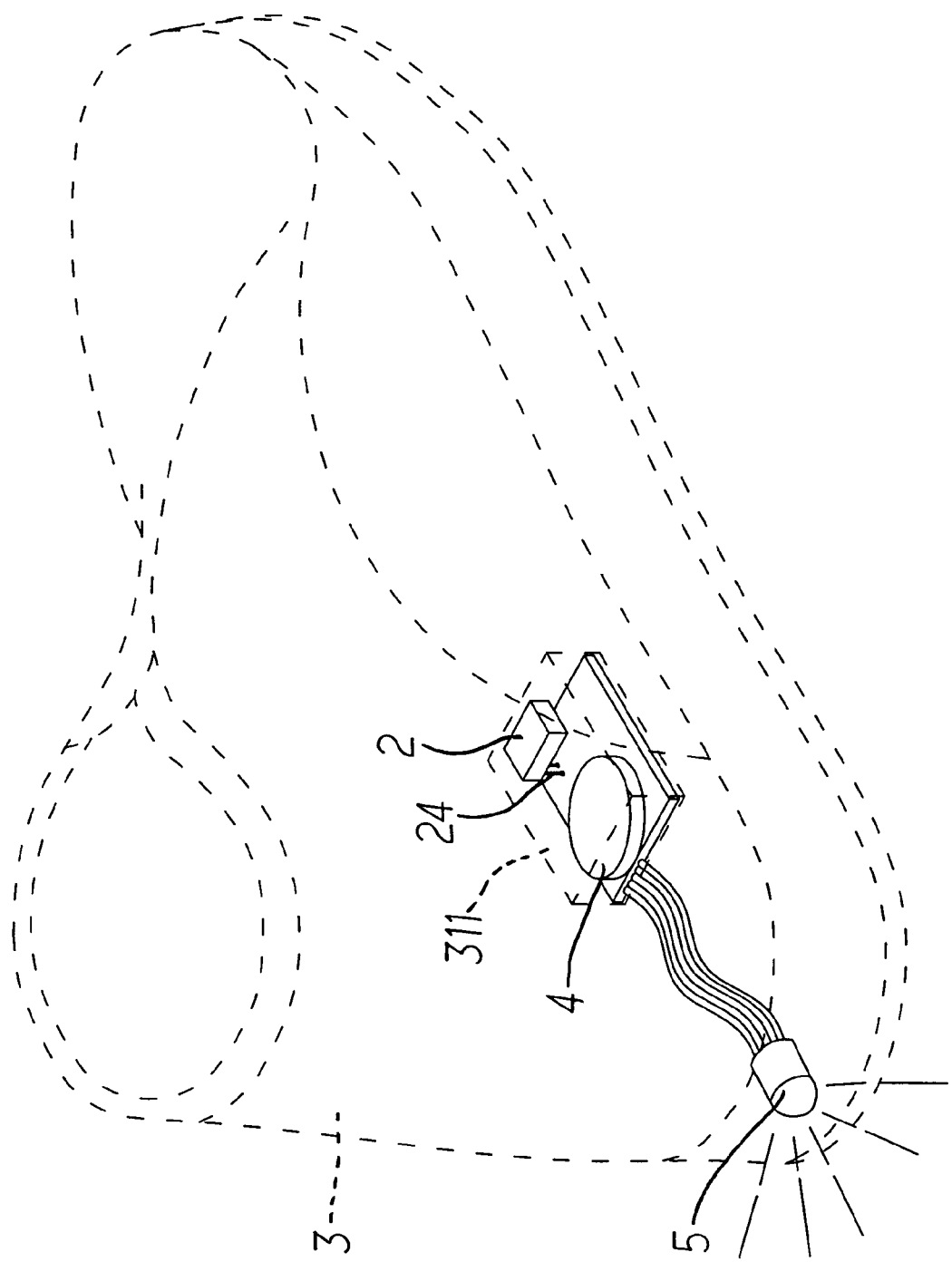
FIG. 6 is a perspective view showing the appearance of the present invention built in a shoe.
Figure 7:
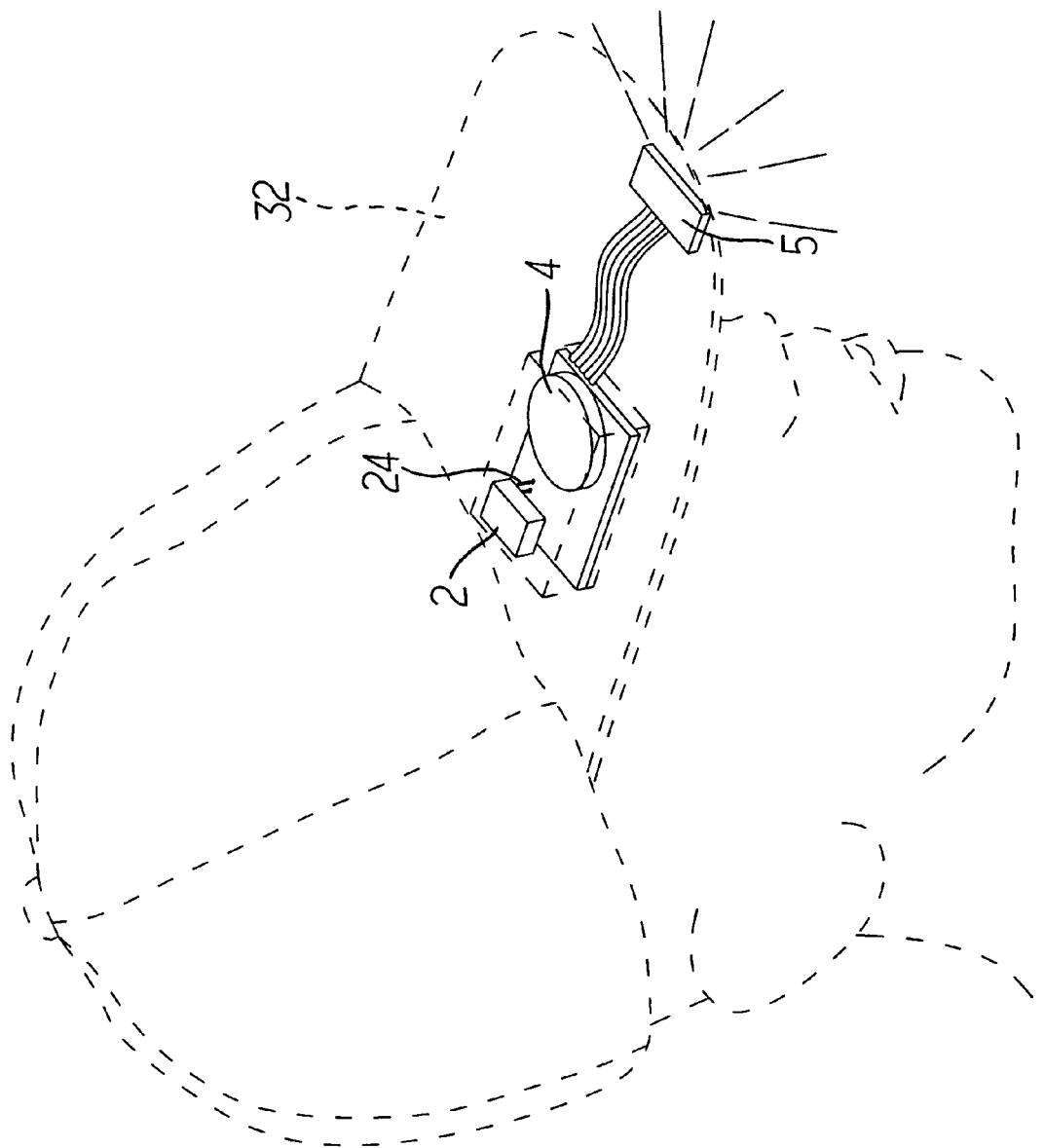
FIG. 7 is a perspective view showing the appearance of the present invention built in a cap.
Figure 8:
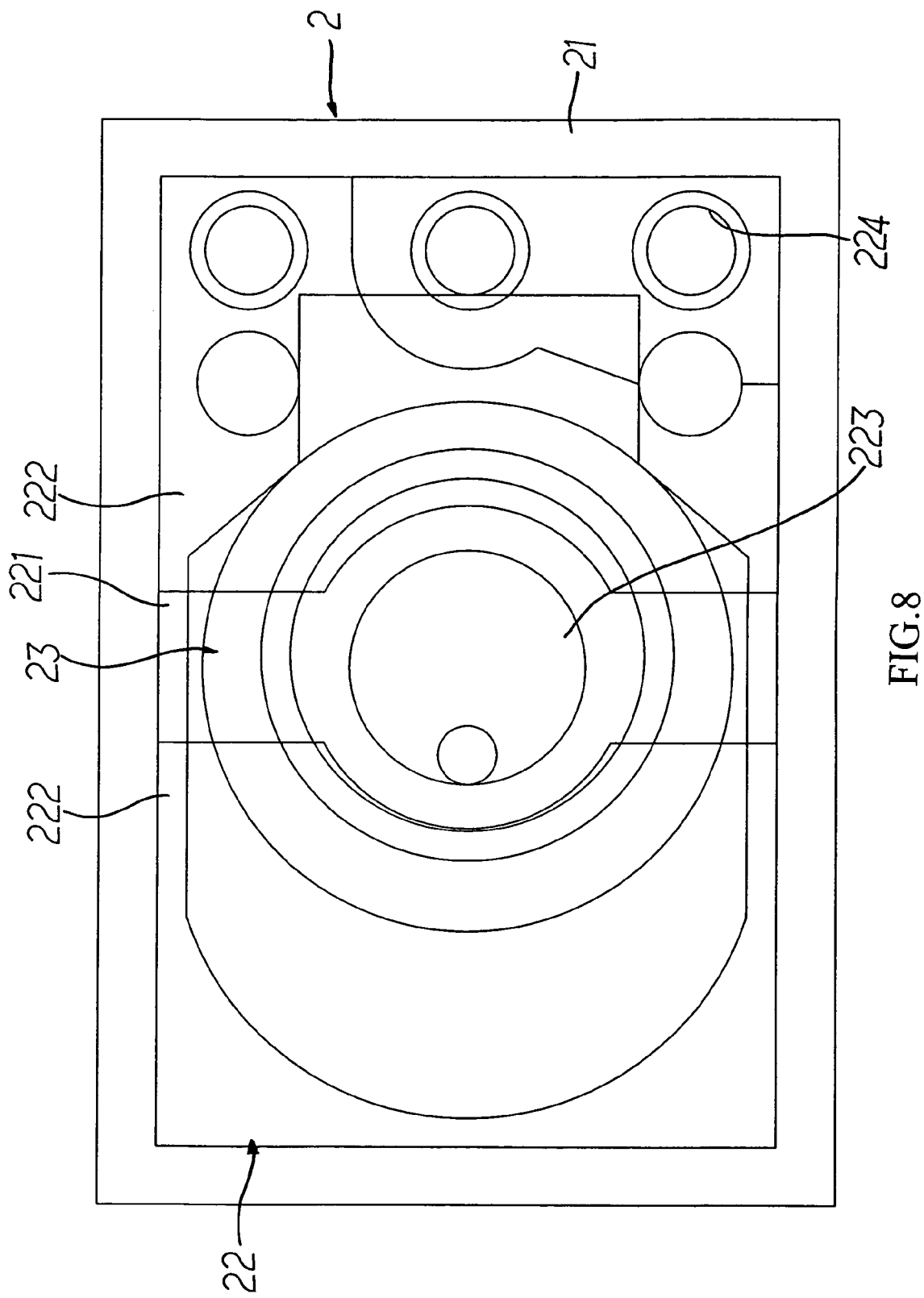
FIG. 8 is a schematic view showing a construction of the present invention conducted through a power source.

Now referring to the preferred embodiment of the present invention as illustrated in FIG. 6, the vibration sensor 2 is built in a shoe 31. A chamber 311 is provided in the shoe 31 to accommodate the vibration sensor 2. The vibration sensor is built in a cap 32 as illustrated in FIG. 7 or clothes. Those multiple conductive posts 24 and the circuit, the cap, clothes or other object is connected to a power source 4, the vibration sensor 2, and an electronic device 5. The user causes the vibration sensor to hit or tap any other object for the elastic metal piece to move as illustrated in FIG. 8. The displacement of the elastic metal piece 23 produced on the substrate 22 allows the elastic metal piece to contact both electrode areas 222 at the same time to conduct through the power source and the electronic device for the power source to supply power to the electronic device.

Figure 9:
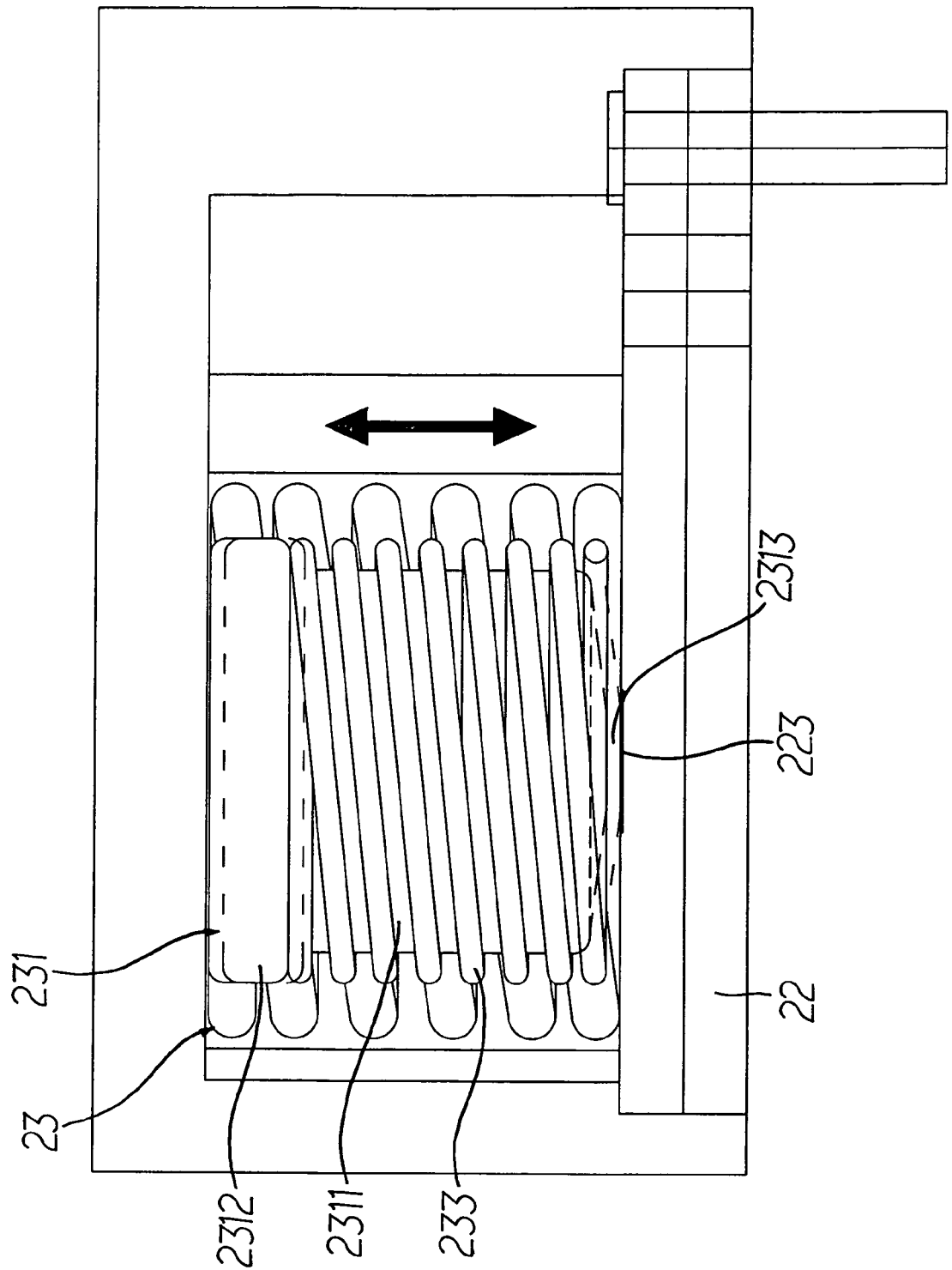
FIG. 9 is a schematic view showing a construction of the present invention in a vibration-conducted status.

With the power on, the user applies longitudinal vibration also as illustrated in FIG. 9 for the load 231 and the inner coil 233 to contact the vibration contact 223 to enable the electronic device by producing intermittent vibration conduction.

Figure 10:
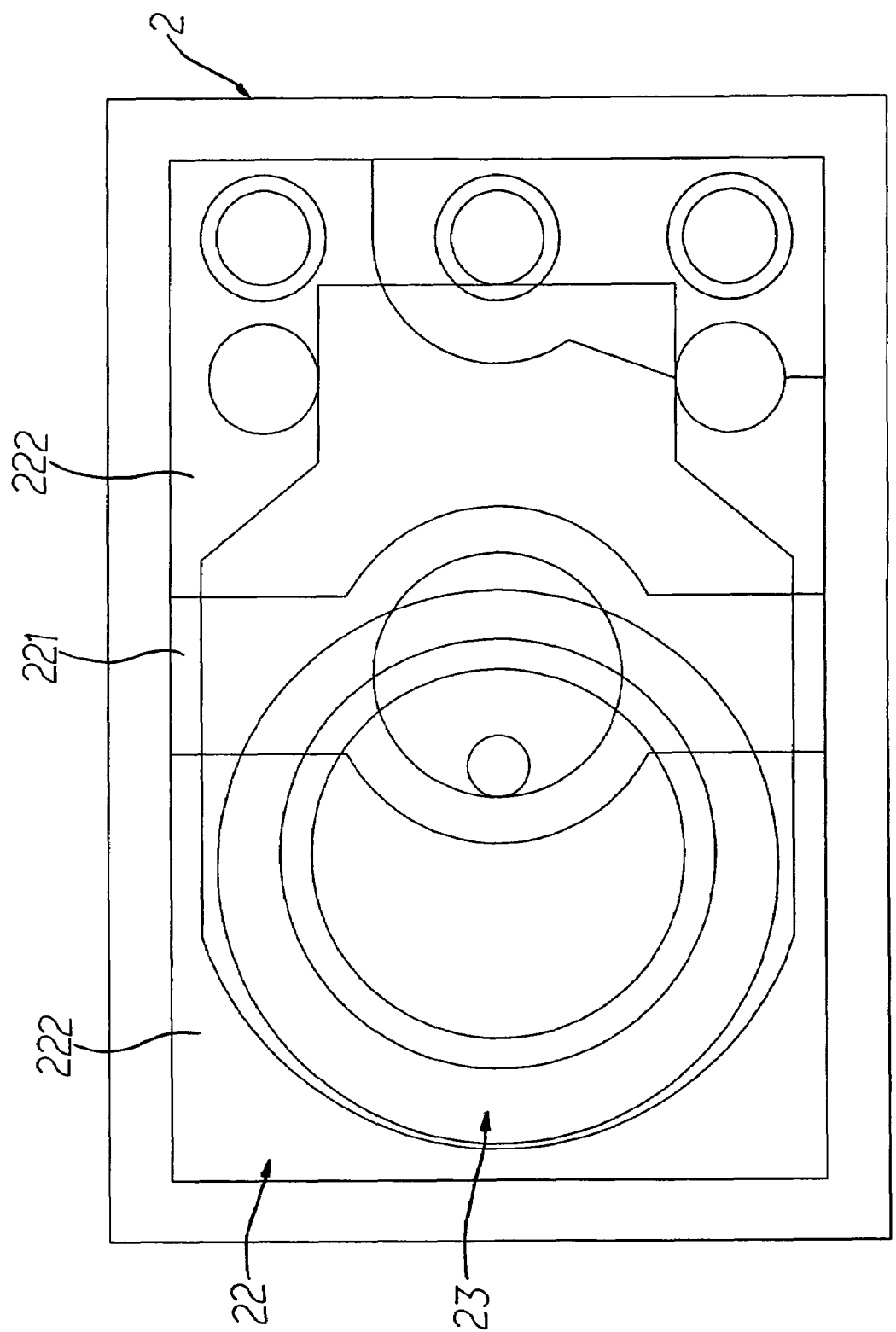
FIG. 10 is a schematic view showing a construction of the present invention with power source in a broken circuit status.

The elastic metal piece 23 laterally moves on the substrate 22 for the elastic metal piece 23 not to contact both electrode areas 222 at the same time as illustrated in FIG. 10, the circuit between the power source and the electronic device is broken, and no power will be supplied to the electronic device with the power source in a off status. The electronic device is disabled even when the vibration sensor is subject to a force from longitudinal vibration.

As illustrated in FIGS. 6 and 7, the power source 4 is related to a cell; and the electronic device, to a light source or a loudspeaker. The power from the power source 4 may be selected to be On or Off by means of the vibration sensor 2 to transmit the power to the electronic device 5; and the electronic device 5 may produce intermittent conduction by vibration to emit light or produce sound. Furthermore, the light source may be comprised of one or a plurality of light emitting diode (LCD) in single color or multiple colors to produce single color light source or colorful light source effects.

If the built-in vibration sensor of the present invention, is being transported or displayed, the circuit between the power source and the electronic device may be broken by means of the elastic metal piece. As a result, the power source will not be unnecessarily consumed because the electronic device will not consume power even though the vibration sensor has been contacted and a circuit formed.

A switch indicator 213 may be disposed to the outer side of the casing as illustrated in FIG. 5 to mark the direction of conduction for the power source to permit the user to move the elastic metal piece by having the casing to hit or tap any other object in the direction as marked by the switch indicator 213. As illustrated, the elastic metal piece is guided to the direction of On as marked by the switch indicator 213 to conduct the power source through the electronic device before enabling the electronic device to produce intermittent conduction by vibration.

Figure 11:
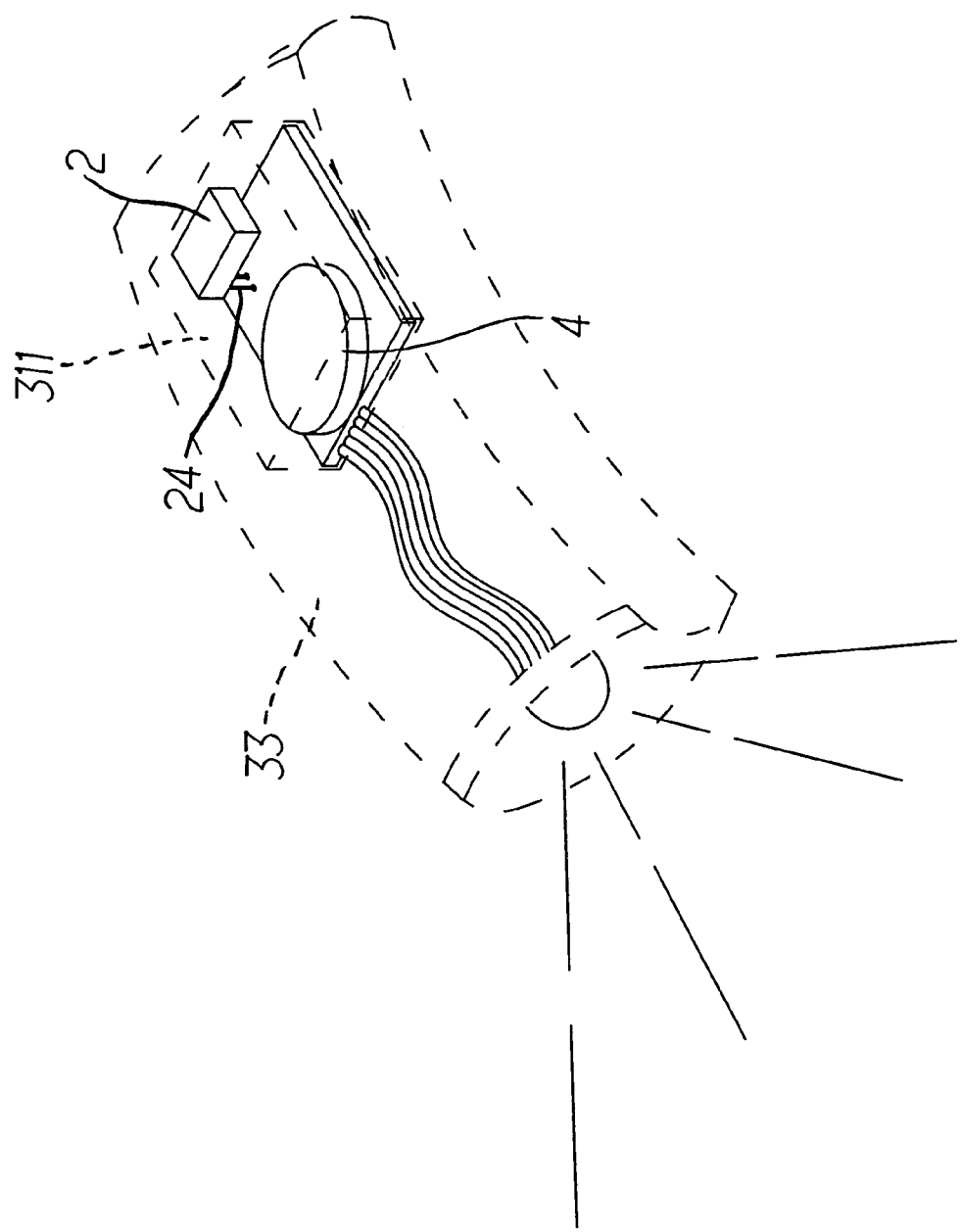
FIG. 11 is a perspective view showing that the present invention is built in a flashlight.
Figure 12:
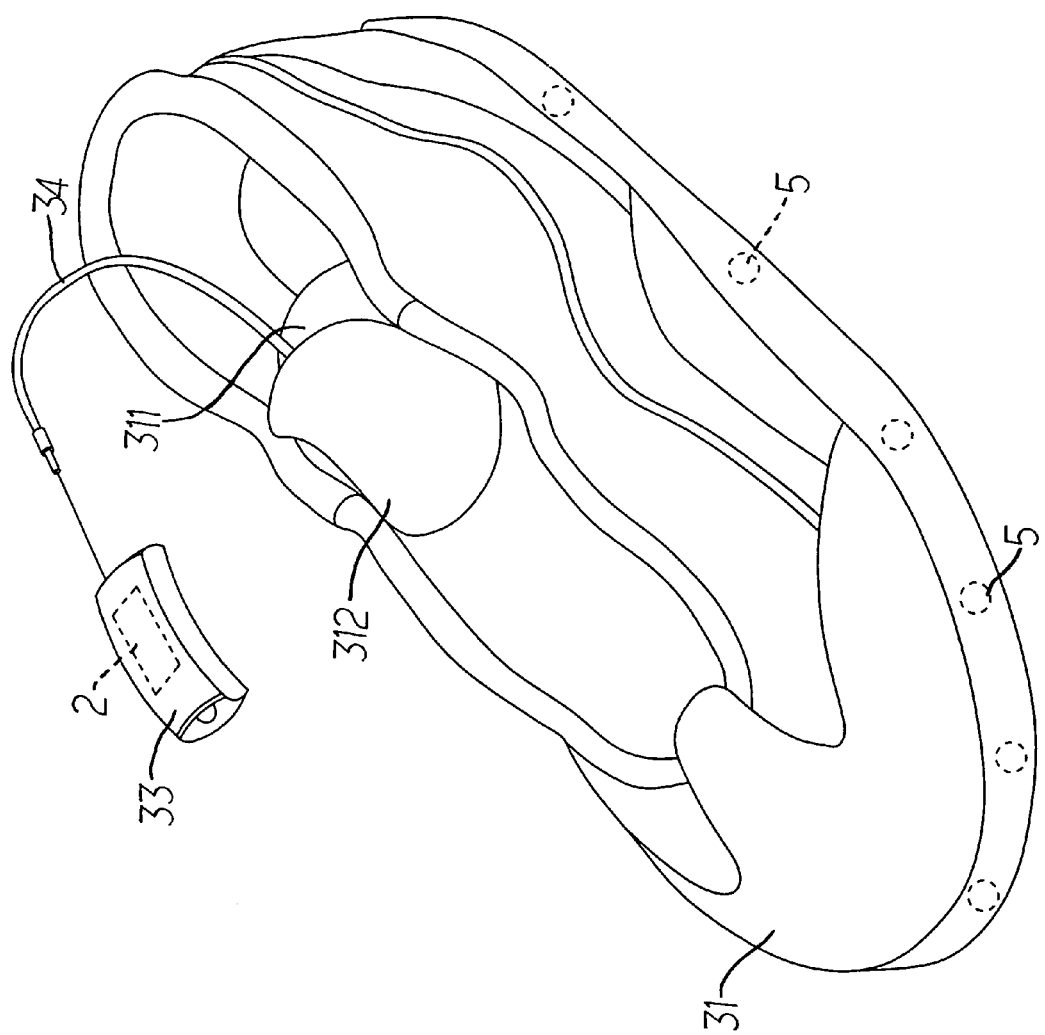
FIG. 12 is an exploded view showing the appearance of the flashlight in FIG. 11 is built in a shoe.

Furthermore, as illustrated in FIG. 11, the vibration sensor 2 is built in a flashlight 33. A chamber 311 is disposed inside the flashlight 33 to accommodate the vibration sensor 2. The flashlight 33 may be further provided in a shoe 31 as illustrated in FIG. 12. Wherein, a chamber 311 is disposed in a tongue 312 of the shoe to accommodate the flashlight. A conductor 34 is then used to connect each electronic device 5 disposed in the sole of the shoe 31 to the flashlight 33. Accordingly, when the shoe hits or taps any other object to turn on the power source and conduct through the electronic device, the electronic device (e.g., a light source) produces intermittent conduction (e.g., lighting) by vibration. If the flashlight 33 is disconnected, it functions as a normal flashlight for the present invention to achieve the results of multiple uses.

The prevent invention provides an improved structure of a vibration sensor built in an object, and the application for a utility patent is duly filed accordingly. However, it is to be noted that the preferred embodiments disclosed in the specification and the accompanying drawings are not limiting the present invention; and that any construction, installation, or characteristics that is same or similar to that of the present invention should fall within the scope of the purposes and claims of the present invention.

I claim:

1. A vibration sensor built in an object includes the object containing a chamber to accommodate the vibration sensor; the vibration sensor includes a casing, a substrate, an elastic metal piece, and a transmission contact; the casing having one side disposed with an opening and screened by means of a substrate and containing an accommodation space; a separation zone being provided on the substrate to segregate two electrode areas, a vibration contact separated from both electrode areas being disposed on the separation zone, and either electrode area being disposed with the transmission contact; the elastic metal piece contained in the accommodation space of the vibration sensor to engage in displacement to simultaneously contact or not to contact both electrode areas, and causing the vibration contact to be conducted through or disconnected; and the transmission contact being connected to a power source, the substrate, and an electronic device to selectively transmit the power from the power source to the electronic device through the substrate while enabling the electronic device to produce intermittent conduction.

2. A vibration sensor of claim 1, wherein the elastic metal piece includes a load, an outer coil, and an inner coil; the load includes a column and a flange protruding from the column, and a nipple to contact the substrate being disposed on the distal side to the flange of the column.

3. A vibration sensor of claim 2, wherein the inner diameter of the outer coil is slightly greater than the diameter of the flange for the outer coil to be merely inserted onto the outer side of the flange.

4. A vibration sensor of claim 2, wherein the length of the outer coil is slightly greater than the height of the accommodation space.

5. A vibration sensor of claim 2, wherein the inner diameter of the inner coil is slightly greater than the diameter of the column for the inner coil to be merely inserted onto the outer side of the column of the load.

6. A vibration sensor of claim 1, wherein the object is related to apparel or a flashlight.

7. A vibration sensor of claim 6, wherein the flashlight is built in a shoe, a chamber is formed in the tongue of the shoe to accommodate the flashlight, and each electronic device disposed in the sole of the shoe is connected to the flashlight by means of a conductor.

8. A vibration sensor of claim 1, wherein the substrate is related to a circuit board.

9. A vibration sensor of claim 1, wherein multiple holes are disposed on the substrate for the transmission contact, multiple conductive posts in the same number as that of the holes receive insertion of their corresponding conductive posts; and the circuit is connected among those conductive posts, the power source, and the electronic device.

10. A vibration sensor of claim 1, wherein the power source relates to a cell.

11. A vibration sensor of claim 1, wherein the electronic device is related to a light source or a loudspeaker.

12. A vibration sensor of claim 11, wherein the light source is comprised of one or a plurality of single color or multiple-color light emitting diode.

13. A vibration sensor of claim 1, wherein a SW indication is provided on the outer side of the casing to mark the conductive direction of the power source.

* * * * *